US008134441B1

(12) United States Patent
Bokor et al.

(10) Patent No.: US 8,134,441 B1
(45) Date of Patent: Mar. 13, 2012

(54) NANOMAGNETIC SIGNAL PROPAGATION AND LOGIC GATES

(75) Inventors: Jeffrey Bokor, Oakland, CA (US); Nathan C. Emley, Oakland, CA (US); David Carlton, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 800 days.

(21) Appl. No.: 12/131,669

(22) Filed: Jun. 2, 2008

(51) Int. Cl.
*H01F 7/02* (2006.01)
*H01F 1/00* (2006.01)

(52) U.S. Cl. ........ 335/306; 335/209; 335/219; 335/284; 335/302; 335/303; 335/304; 29/607

(58) Field of Classification Search .................. 335/209, 335/219, 284, 285, 302–306; 29/607
See application file for complete search history.

(56) References Cited

U.S. PATENT DOCUMENTS

| | | | | |
|---|---|---|---|---|
| 6,614,084 | B1* | 9/2003 | Cowburn et al. | 257/414 |
| 6,774,391 | B1* | 8/2004 | Cowburn | 257/24 |
| 6,867,988 | B2* | 3/2005 | Cowburn | 365/41 |
| 7,120,049 | B2* | 10/2006 | Nakamura et al. | 365/171 |
| 7,126,848 | B2* | 10/2006 | Nakamura et al. | 365/171 |
| 7,175,778 | B1* | 2/2007 | Bhargava et al. | 252/62.51 R |
| 7,644,489 | B2* | 1/2010 | Arora et al. | 29/607 |
| 2004/0027899 | A1* | 2/2004 | Cowburn | 365/222 |
| 2006/0091914 | A1* | 5/2006 | Bourianoff et al. | 326/104 |
| 2006/0222896 | A1* | 10/2006 | Inomata et al. | 428/826 |
| 2007/0054154 | A1* | 3/2007 | Leu | 428/836.3 |
| 2007/0183188 | A1* | 8/2007 | Kim et al. | 365/158 |

OTHER PUBLICATIONS

Alam, M. T. et al., "Clocking Scheme for Nanomagnet QCA," Proceedings of the 7th IEEE International Conference on Nanotechnology, Aug. 2-5, 2007, Hong Kong, pp. 403-408.
Behin-Aein, B. et al., "Switching Energy of Ferromagnetic Logic Bits," arXiv:0804.1389, Apr. 9, 2008.
Bernstein, G.H. et al., "Magnetic QCA Systems," Microelectronics Journal, available online May 31, 2005, vol. 36, pp. 619-624.
Csaba, G. et al., "Power Dissipation in Nanomagnetic Logic Devices," 4th IEEE Conference on Nanotechnology, 2004, pp. 346-348.
Csaba, G. et al., "Simulation of Power Gain and Dissipation in Field-Coupled Nanomagnets," Journal of Computational Electronics, 2005, vol. 4, pp. 105-110.
Kowalewski, M et al., "Thickness and Temperature-Dependence of Magnetic Anisotropies in Ultrathin fcc Co (001) Structures," Physical Review B, The American Physical Society, Apr. 1993, vol. 47, No. 14, pp. 8748-8753.

(Continued)

*Primary Examiner* — Mohamad Musleh
(74) *Attorney, Agent, or Firm* — Withrow & Terranova, P.L.L.C.

(57) ABSTRACT

A method and system for propagating signals along a line of nanomagnets. Nanomagnets having an easy axis and a hard axis are provided a biaxial anisotropy term, which increases metastability along the hard axis. The nanomagnets are forced into hard-axis alignment. A magnetization direction of a first nanomagnet is caused to cant upward. Dipole coupling interactions between the first nanomagnet and an adjacent nanomagnet cause a magnetization direction of the adjacent nanomagnet to cant downward in an anti-parallel alignment. This cascade continues reliably along the line of nanomagnets. The biaxial anisotropy term provides additional stability along the hard axis to ensure the nanomagnets do not prematurely align along the easy axis. Various logic gates using nanomagnets, stabilizer nanomagnets, destabilizer nanomagnets, and magnetic diodes are also disclosed.

24 Claims, 12 Drawing Sheets

OTHER PUBLICATIONS

Niemier, M. et al., "Clocking Structures and Power Analysis for Nanomagnet-Based Logic Devices," Proceedings of the 2007 International Symposium on Low Power Electronics and Design, Aug. 27-29, 2007, Portland, OR, USA: ACM, 2007, pp. 26-31.

Niemier, M. et al., "Bridging the Gap Between Nanomagnetic Devices and Circuits," IEEE International Conference on Computer Design (ICCD), Oct. 12, 2008, pp. 506-513.

Nikonov, D. E. et al., "Simulation of Highly Idealized, Atomic Scale Magnetic Quantum Cellular Automata Logic Circuits," Journal of Nanoelectronics and Optoelectronics, Mar. 2008, vol. 3, No. 1, pp. 3-11.

Yang, T. et al., "Giant Spin-Accumulation Signal and Pure Spin-Current-Induced Reversible Magnetization Switching," Nature Physics, Nov. 2008, vol. 4, pp. 851-854.

Berling, P. et al, "Magnetization Reversal Mechanisms in Epitaxial FE/SI(0 0 1) Layers with Twofold and Fourfold Magnetic Anisotropies," Journal of Magnetism and Magnetic Materials, 2001, pp. 181-190, vol. 237,k Elsevier Science B.V.

Cowburn, R. P., "Probing Antiferromagnetic Coupling Between Nanomagnets," Physical Review B, 2002, pp. 1-4, vol. 65, No. 092409, The American Physical Society.

Cowburn, R. P. et al., "Room Temperature Magnetic Quantum Cellular Automata," Science, 2000, pp. 1466-1468, vol. 287, American Association for the Advancement of Science.

Csaba, Gyorgy et al., "Nanocomputing by Field-Coupled Nanomagnets," IEEE Transactions on Nanotechnology, Dec. 2002, pp. 209-213, vol. 1, No. 4, IEEE.

Imre, Alexandra et al., "Investigation of Shape-Dependent Switching of Coupled Nanomagnets," Superlattices and Microstructures, 2003, pp. 513-518, vol. 34, Elsevier Ltd.

Imre, Alexandra et al., "Majority Logic Gate for Magnetic Quantum-Dot Cellular Automata," Science, 2006, pp. 205-208, vol. 311, American Association for the Advancement of Science.

Lee, Fred S., "Shape-Induced Biaxial Anisotropy in Thin Magnetic Films," IEEE Transactions on Magnetics, Sep. 1968, pp. 502-506, vol. Mag-4, No. 3, IEEE.

Parish, M. C. B. et al., "Physical Constraints on Magnetic Quantum Cellular Automata," Applied Physics Letters, Sep. 8, 2003, pp. 2046-2048, vol. 83, No. 10, American Institute of Physics.

Notice of Allowance mailed Sep. 2, 2011, for U.S. Appl. No. 12/505,898, 13 pages.

\* cited by examiner

NANOMAGNETIC SIGNAL PROPAGATION AND LOGIC GATES

FIELD OF THE INVENTION

This invention generally relates to nanomagnetic signal propagation, and in particular relates to increasing hard-axis metastability in nanomagnets.

BACKGROUND OF THE INVENTION

There is interest in exploring the use of nanometer-scale magnets, or nanomagnets, in signal propagation. There has been some limited success in propagating a signal along a row of nanomagnets. A force is applied to a row of nanomagnets to cause the magnetization direction of each nanomagnet to align with its relatively unstable hard axis, and then the external magnetic field is removed. The magnetization direction of a first nanomagnet in the row of nanomagnets is perturbed to cause the magnetization direction of the first nanomagnet to align with its relatively stable easy axis. Magnetic dipole field coupling between adjacent nanomagnets ideally causes a cascade of anti-parallel alignment of magnetization directions along the row of nanomagnets. However, cascade success depends on the magnetization direction of each nanomagnet staying in its relatively unstable hard-axis alignment until perturbed by the dipole field of the signal propagating from an adjacent nanomagnet. Unfortunately, variables such as thermal fluctuations, transient electromagnetic fields, and lithographic inconsistencies can affect hard-axis stability and cause the magnetization direction in a nanomagnet to prematurely align with its easy axis, ruining the reliability of the cascade. Thus, there is a need to increase hard-axis magnetization stability in nanomagnets to increase the reliability of signal propagation.

SUMMARY OF THE INVENTION

According to one embodiment of the present invention, a row of nanomagnets propagates a signal as a function of magnetization direction. Each nanomagnet in the row of nanomagnets has a bistable easy axis and a metastable hard axis. The nanomagnets are arranged in hard-axis alignment and positioned a distance from each other such that the magnetization direction of a nanomagnet aligned along its hard axis can be affected by dipole field coupling interactions with an adjacent nanomagnet. The magnetization direction of each nanomagnet in the row of nanomagnets can be forced to align along the hard axis through application of a force. After the force is removed, the magnetization direction remains aligned along the hard axis until perturbed by an adjacent signal-propagating nanomagnet.

A first nanomagnet is perturbed such that its magnetization direction aligns with its easy axis, and dipole field coupling causes an adjacent nanomagnet to align in an anti-parallel direction with respect to the first nanomagnet. This easy axis alignment in anti-parallel direction cascades reliably along the row of nanomagnets.

According to one embodiment of the present invention, hard-axis metastability is created by aligning an easy axis of a biaxial anisotropy characteristic with a hard axis of a uniaxial anisotropic characteristic. Proper axes alignment increases nanomagnet hard-axis metastability so that factors such as thermal fluctuations, lithographic inconsistencies, and the like are insufficient to cause the magnetization direction to prematurely align along the easy axis prior to perturbation by the adjacent signal-propagating nanomagnet.

According to another embodiment of the present invention, nanomagnets in a column propagate a signal as a function of magnetization direction. The nanomagnets are aligned along their easy axes and unidirectional stabilizer nanomagnets are positioned adjacent to the nanomagnets in the column to increase hard-axis stability of the nanomagnets. The unidirectional stabilizer nanomagnets retain their magnetization direction due to a relatively large magnetic dipole moment, a biaxial anisotropy characteristic, and a substantially square shape that reduces shape anisotropy. Since the magnetization direction of the unidirectional stabilizer nanomagnets is identical to the magnetization direction of the nanomagnets when in hard-axis alignment, the hard-axis stability of the nanomagnets in the column is enhanced.

According to yet another embodiment of the present invention, a unidirectional nanomagnet is formed by positioning a first biasing magnet adjacent to a first side of a nanomagnet and closer to a first end portion of the nanomagnet, and positioning a second biasing magnet adjacent to a second side of the nanomagnet and closer to a second end portion of the nanomagnet. The first and second biasing magnets bias the magnetization direction of the nanomagnet such that the magnetization direction is prevented from aligning in a particular direction along the easy axis. The unidirectional nanomagnet can be used to inhibit signal propagation along a column of nanomagnets as a function of the magnetization direction of a signal-propagating adjacent nanomagnet.

According to yet another embodiment of the present invention, nanomagnetic logic gates are formed using nanomagnets and unidirectional nanomagnets that eliminate race conditions of signals propagating along multiple signal paths. The nanomagnetic logic gates can be configured to perform digital logic operations such as AND, NAND, NOR, and OR operations.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 9:
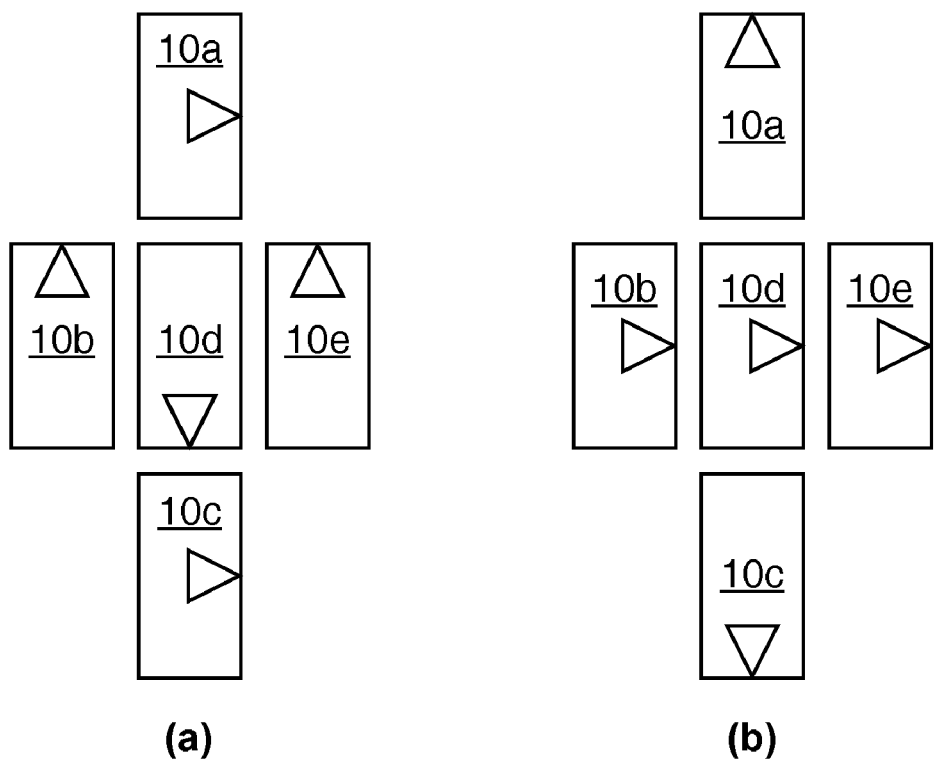

FIGS. 9(a) and 9(b) illustrate race conditions in a nanomagnetic logic gate.

Figure 10A:
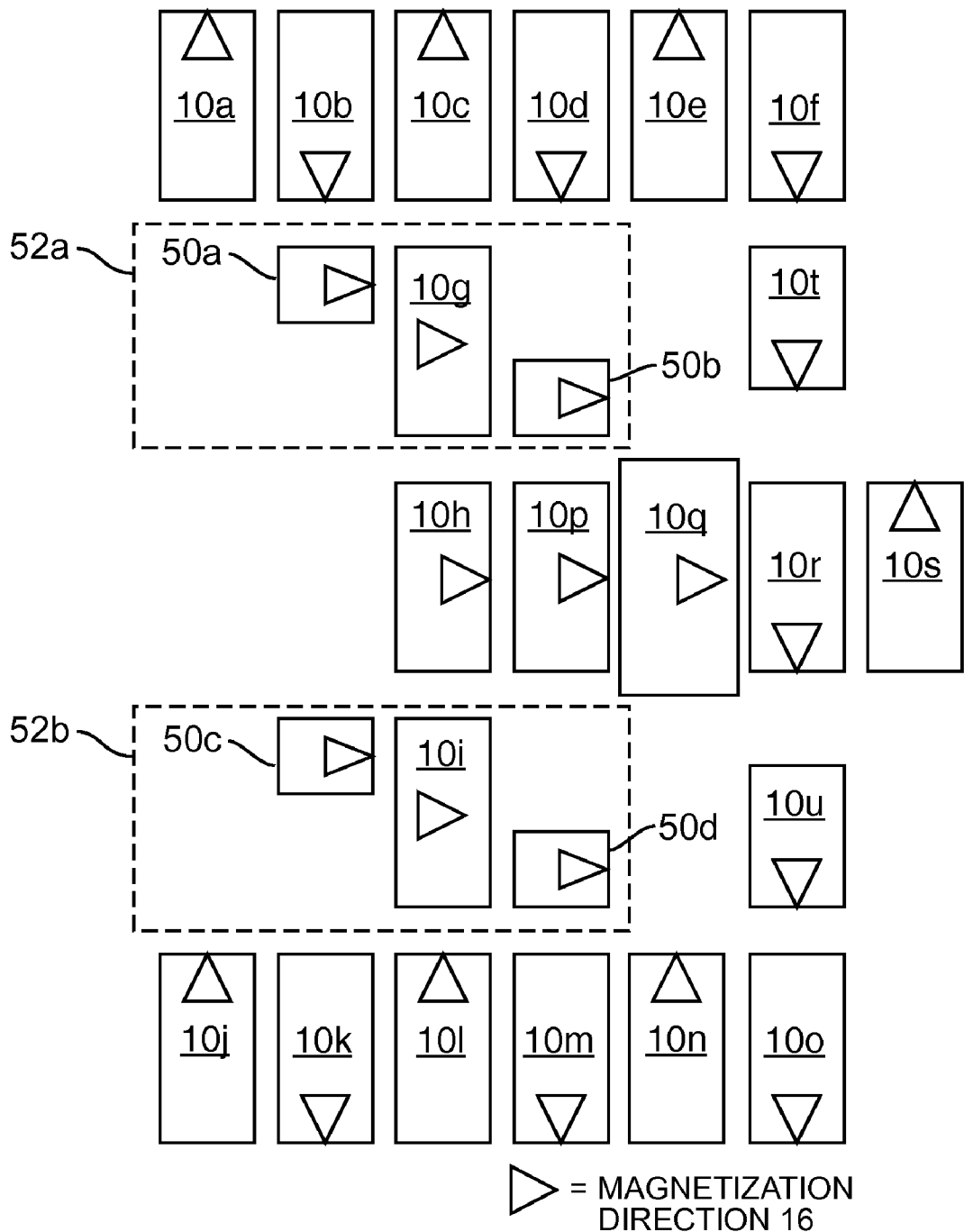
Figure 10B:
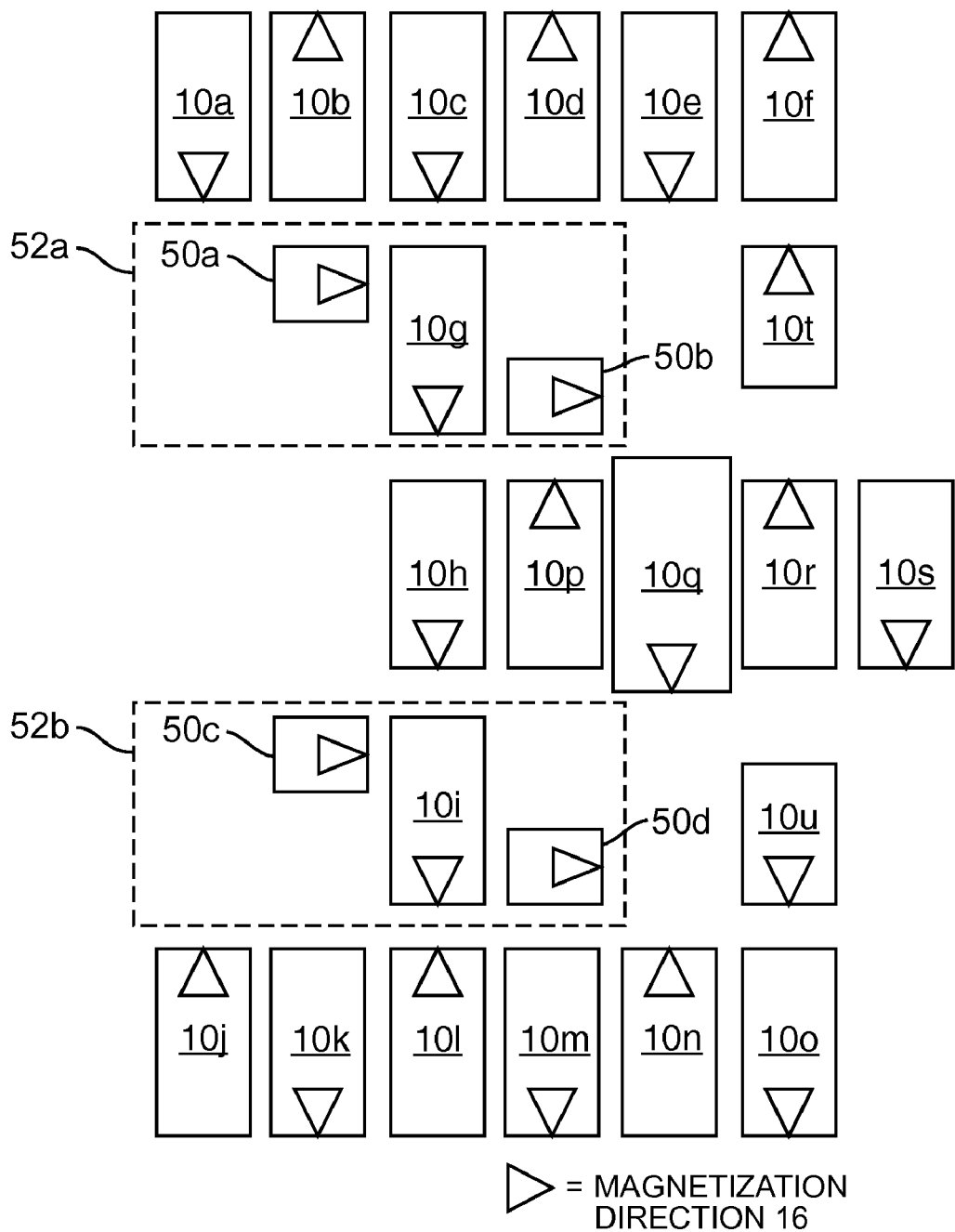

FIGS. 10A and 10B illustrate nanomagnetic logic gates that are impervious to race conditions.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
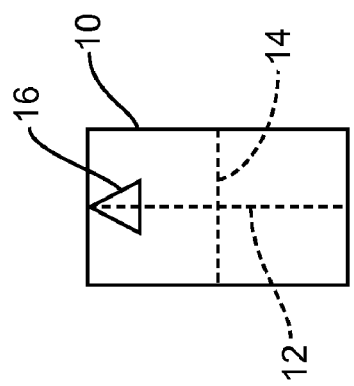
FIG. 1 is a diagram of a nanomagnet according to one embodiment of the present invention.

FIG. 1 shows a nanomagnet 10 having an easy axis 12, a hard axis 14, and a magnetization direction 16. A nanomagnet has a magnetic dipole defined by a dipole moment, which is a vector quantity having both a direction and a magnitude. As used herein, references to direction and/or magnetization direction refer to the direction component of the dipole moment associated with a respective nanomagnet. Generally, magnetic anisotropy relates to a direction dependence of a magnetic material. Due to a primary anisotropy characteristic, such as a uniaxial anisotropy characteristic, the magnetization direction 16 is inclined to align with, or along, the easy axis 12, because the magnetization energy of a respective nanomagnet is at a lower energy state when the magnetization direction 16 is aligned along the easy axis 12 than when the magnetization direction 16 is not aligned along the easy axis 12. Thus, a nanomagnet 10 having a uniaxial anisotropy characteristic has an easy axis 12, defined by an energy minima along that easy axis 12, and a hard axis 14. A magnetization direction 16 can also be biased, induced, or otherwise forced to align along the hard axis 14, but stability is tenuous when so aligned because the magnetization energy of the nanomagnet is higher than when aligned along the easy axis 12.

The uniaxial anisotropy characteristic typically has an associated uniaxial anisotropy term quantifying the magnetization energy of a nanomagnet as a function of magnetization direction, according to approximately the following equation:

$$U(\theta) = E_{uniax} = K_u \cos^2(\theta), \quad (1)$$

wherein $\theta$ is the in-plane angle of the uniform magnetization direction relative to the hard axis 14 in the absence of an external field, and $K_u$ is the uniaxial shape anisotropy constant. Where the uniaxial anisotropy characteristic is caused by shape anisotropy, the value of $K_u$ can be changed by altering the shape of the nanomagnet 10. Nanomagnets according to one embodiment of the present invention also have a secondary anisotropy characteristic, such as a biaxial anisotropy characteristic. A biaxial anisotropy characteristic also introduces one or more easy axes into a nanomagnet because the biaxial anisotropy term, as discussed below, has four energy minimas. Through alignment of an easy axis introduced by the biaxial anisotropy characteristic with the hard axis introduced by the uniaxial anisotropy characteristic, the present invention creates metastability along the hard axis 14 of the nanomagnet 10. The overall magnetization energy 'landscape' of the nanomagnet 10 can be approximately expressed in the following equation:

$$U(\theta) = K_u \cos^2(\theta) + \tfrac{1}{4} K_1 \sin^2(2\theta). \quad (2)$$

wherein $K_1$ is the biaxial anisotropy constant. As used herein, the added term to equation (2), i.e. $\tfrac{1}{4} K_1 \sin^2(2\theta)$, will be referred to as a biaxial anisotropy term, as it defines how the addition of a biaxial anisotropy characteristic to the nanomagnet 10 alters the magnetization energy landscape of the nanomagnet 10 to introduce metastability along the hard axis 14, as discussed herein. The phrases 'uniaxial anisotropy term' and 'biaxial anisotropy term' will be used herein to describe how the uniaxial anisotropy characteristic and the biaxial anisotropy characteristic, respectively, are used in the various embodiments disclosed herein.

The magnetization energy of a respective nanomagnet is at a higher energy level when the magnetization direction 16 is aligned along the hard axis 14 than when the magnetization direction 16 is aligned along the easy axis 12. For clarity, as described throughout this specification, signal-propagating nanomagnets are shown in a rectangular shape and have both a long dimension and a short dimension, although nanomagnets may be formed with a primary anisotropy characteristic and a secondary anisotropy characteristic in accordance with the present invention by mechanisms other than the use of rectangular-shaped nanomagnets, such as, for example, through magnetocrystalline anisotropy, strain anisotropy, and exchange biasing. The axis that runs parallel to the long dimension will be referred herein to as the easy axis, which is a bistable axis, and the axis that runs parallel to the short dimension will be referred to herein as the hard axis, which is a metastable axis. The phrase 'bistable' is used to indicate that the magnetization direction can align in either direction along the easy axis. The phrase 'metastable' is used to indicate increased stability along the hard axis due to alignment of an easy axis associated with a secondary anisotropy characteristic with a hard axis associated with a primary anisotropy characteristic.

Magnets with biaxial anisotropy characteristics can be formed by, for example, epitaxially depositing cobalt onto a single-crystal copper substrate by molecular beam epitaxy. The resulting cobalt films can form with a face-centered cubic lattice, which exhibits biaxial anisotropy. Successful deposition of an epitaxial film, where there is a long-range order in the position of the atoms, relies on the film and the substrate having similar atomic spacings. Consequently, deposition of epitaxial magnetic films is not limited to cobalt nor is it limited to molecular beam epitaxy. Stress on a magnetic film is another mechanism for inducing biaxial anisotropy through magnetostriction effects. Irrespective of the mechanism for introducing the biaxial anisotropy characteristic into the nanomagnet 10, according to one embodiment of this invention, an easy axis associated with the biaxial anisotropy characteristic is aligned with a hard axis associated with the uniaxial anisotropy characteristic to create a metastable hard axis in the nanomagnet 10.

Magnetization direction can be used to represent data, including, for example, a binary one or zero. For purposes of illustration, as used herein, a magnetization direction 16 pointing upward along the bistable easy axis 12 will be used to represent a binary one, and a magnetization direction 16 pointing downward along the easy axis 12 will be used to represent a binary zero. However, it will be apparent to those skilled in the art that other types of data could be represented via magnetization direction 16, and whether a particular direction represents a binary one or zero is arbitrary. Additionally, the figures used herein to illustrate signal propagation along rows of nanomagnets generally show signal propagation from left to right for purposes of illustration; however, the present invention is not limited to left to right signal propagation.

Figure 2:
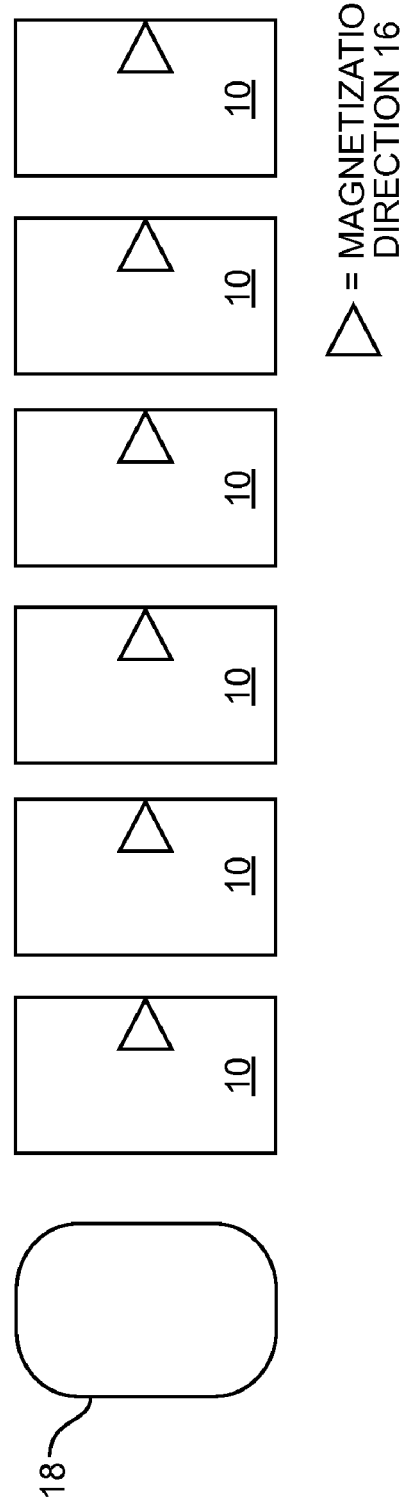
FIG. 2 is an illustration of a row of nanomagnets with their magnetization directions aligned along their respective hard axes.

FIG. 2 illustrates a row of nanomagnets 10 having their magnetization directions 16 aligned along their respective hard axes. The term 'row' will be used herein to refer to an arrangement of nanomagnets wherein the nanomagnets are arranged a distance from one another and aligned along a line extending through their respective hard axes. To ensure successful propagation of a signal when aligned in a row, the nanomagnets 10 are positioned a distance from one another such that dipole field coupling between adjacent nanomagnets 10 is sufficiently strong such that the movement of the magnetization direction 16 from hard-axis alignment to easy-axis alignment of one nanomagnet 10 causes an adjacent nanomagnet 10 that is in hard-axis alignment to swing into anti-parallel easy-axis alignment. By anti-parallel, it is meant that the magnetization direction 16 of each nanomagnet 10 points in the opposite direction of the magnetization direction 16 of an adjacent nanomagnet 10.

According to one embodiment of the present invention, the magnetization direction 16 representing a signal can be propagated along a row of nanomagnets 10 in the following manner. Initially, an alignment mechanism 18 generates a force that is applied to the row of nanomagnets 10, forcing magnetization direction 16 alignment along the hard axis as illustrated in FIG. 2. The alignment mechanism 18 can comprise a magnetic field generator, such as an electromagnet or other suitable mechanism sufficient to force the row of nanomagnets 10 into hard-axis alignment. The magnetic field is then removed and the row of nanomagnets 10 remains in hard-axis alignment due to the metastability introduced by the biaxial anisotropy characteristic. The alignment mechanism could also comprise any other mechanism suitable for inducing, biasing, or otherwise causing the magnetization directions 16 to align along the hard axis, including, for example, spin torque or the use of exchange coupling with a multi-ferroic layer.

The magnetization direction 16 of an initial nanomagnet 10 in the row of nanomagnets 10 is then perturbed such that the magnetization direction 16 aligns along its easy axis. Dipole field coupling between adjacent nanomagnets 10 is strong enough such that the easy-axis alignment of the initial nanomagnet 10 causes the magnetization direction 16 of the adjacent nanomagnet 10 to move off its hard axis, causing the magnetization direction 16 to align in an anti-parallel position with respect to the magnetization direction 16 of the initial nanomagnet 10. Ideally, this effect cascades along the row of nanomagnets 10. However, conventional nanomagnets have tenuous hard-axis stability. Consequently, due to factors and variations such as lithographic roughness, thermal fluctuations, stray magnetic fields, and imperfect alignment, a nanomagnet may prematurely align with its easy axis, thereby ruining successful signal propagation.

Figure 3:
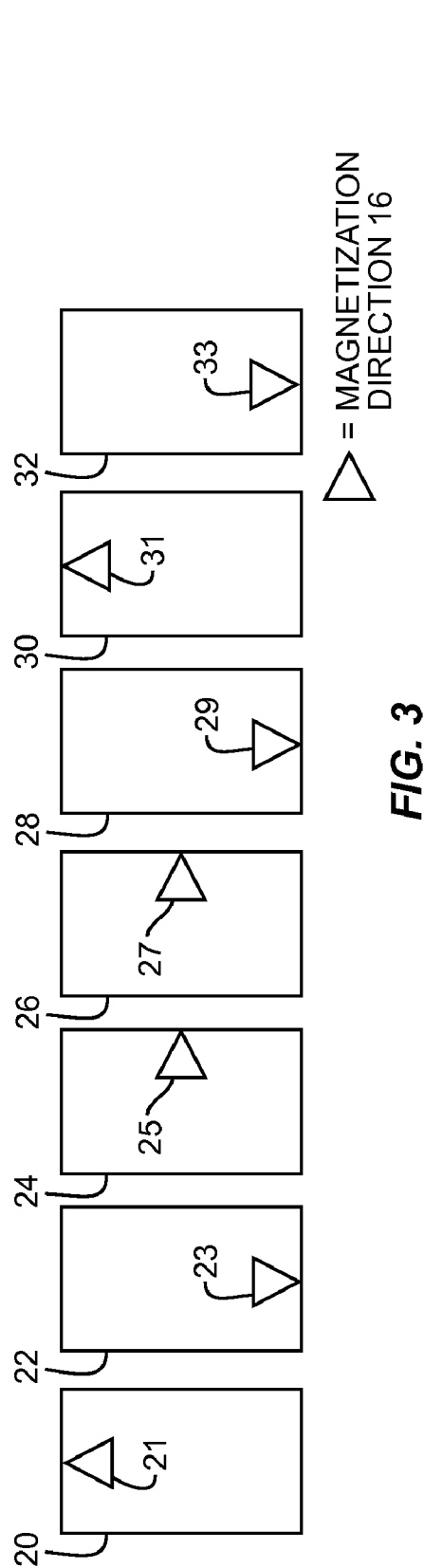
FIG. 3 is an illustration of unsuccessful signal propagation along a row of nanomagnets.

FIG. 3 is an illustration at a particular instance in time showing signal propagation along a row of conventional nanomagnets, wherein a nanomagnet has prematurely aligned with its easy axis, thereby ruining successful signal propagation. Signal propagation initially begins with a nanomagnet 20 having its magnetization direction 21 perturbed such that it aligns pointing upward along its easy axis. Any mechanism suitable for causing magnetization direction perturbation can be used to initiate signal propagation, including via the use of a magnetic field produced by a current-carrying wire. Dipole field coupling between the nanomagnet 20 and an adjacent nanomagnet 22 causes magnetization direction 23 of the nanomagnet 22 to align along its easy axis pointing downward, in an anti-parallel arrangement. As the magnetization direction 23 of the nanomagnet 22 moves downward, dipole field coupling causes magnetization direction 25 of an adjacent nanomagnet 24, shown still in hard-axis alignment, to cant upward.

As the magnetization direction 25 of the nanomagnet 24 begins to cant upward, dipole field coupling between the nanomagnet 24 and an adjacent nanomagnet 26 causes magnetization direction 27 of the nanomagnet 26 to point downward. However, at some point in time prior to the nanomagnet 26 moving off its hard-axis alignment due to the dipole field coupling from the adjacent nanomagnet 24, magnetization direction 29 of adjacent nanomagnet 28 prematurely swings off its hard axis and aligns along its easy axis with its magnetization direction 29 pointing downward. This premature alignment along the easy axis can be caused by a number of different factors, including thermal fluctuations or stray magnetic fields, any of which can be sufficient to prematurely cause a nanomagnet lacking the biaxial anisotropy characteristic of the present invention to prematurely align along the easy axis. The premature alignment initiates a cascade resulting in magnetization direction 31 of adjacent nanomagnet 30 pointing upward and magnetization direction 33 of nanomagnet 32 pointing downward. Because the magnetization direction 29 of the nanomagnet 28 aligned prior to appropriate signal propagation from the nanomagnet 26, the output, reflected in the magnetization direction 33 of the nanomagnet 32 is erroneous.

Figure 4:
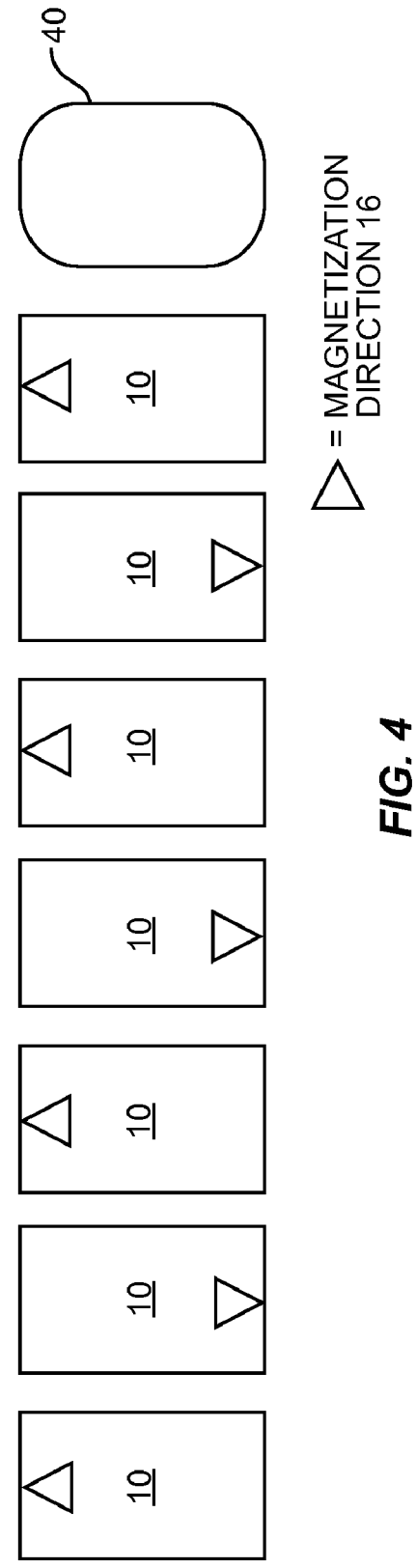
FIG. 4 is an illustration of successful signal propagation along a row of nanomagnets.

FIG. 4 is an illustration showing signal propagation along a row of nanomagnets 10 having metastable hard axes leading to successful signal propagation along the row of nanomagnets 10, according to one embodiment of the present invention. The signal can be read by a field reader 40, which can comprise any mechanism known to those skilled in the art to read a magnetic field, for example a hard drive read/write head using magnetoresistance technology. The metastability along the hard axis prevents premature alignment of the magnetization direction 16 along the easy axis. According to one embodiment of the present invention, the nanomagnets 10 have dimensions of about 100 nanometers (nm)×about 50 nm, a thickness of about 5 nm, are spaced about 20 nm apart from one another, and have a biaxial anisotropy constant of about 50 kilojoules per cubic meter ($kJ/m^3$). According to another embodiment of the present invention, the nanomagnets 10 can range in aspect ratios of height to width of about 1:1 to about 5:1, have widths ranging from about 5 nm to about 100 nm, have lengths ranging from about 5 nm to about 300 nm, and can be spaced a distance ranging from about 5 nm to about 30 nm apart from one another. Such nanomagnets 10 have increased metastability along the hard axis such that their magnetization directions 16 can remain aligned along the hard axis even in the presence of thermal fluctuations, stray magnetic fields, lithographic inconsistencies, and the like, enabling successful signal propagation along the row of nanomagnets 10.

Figure 5:
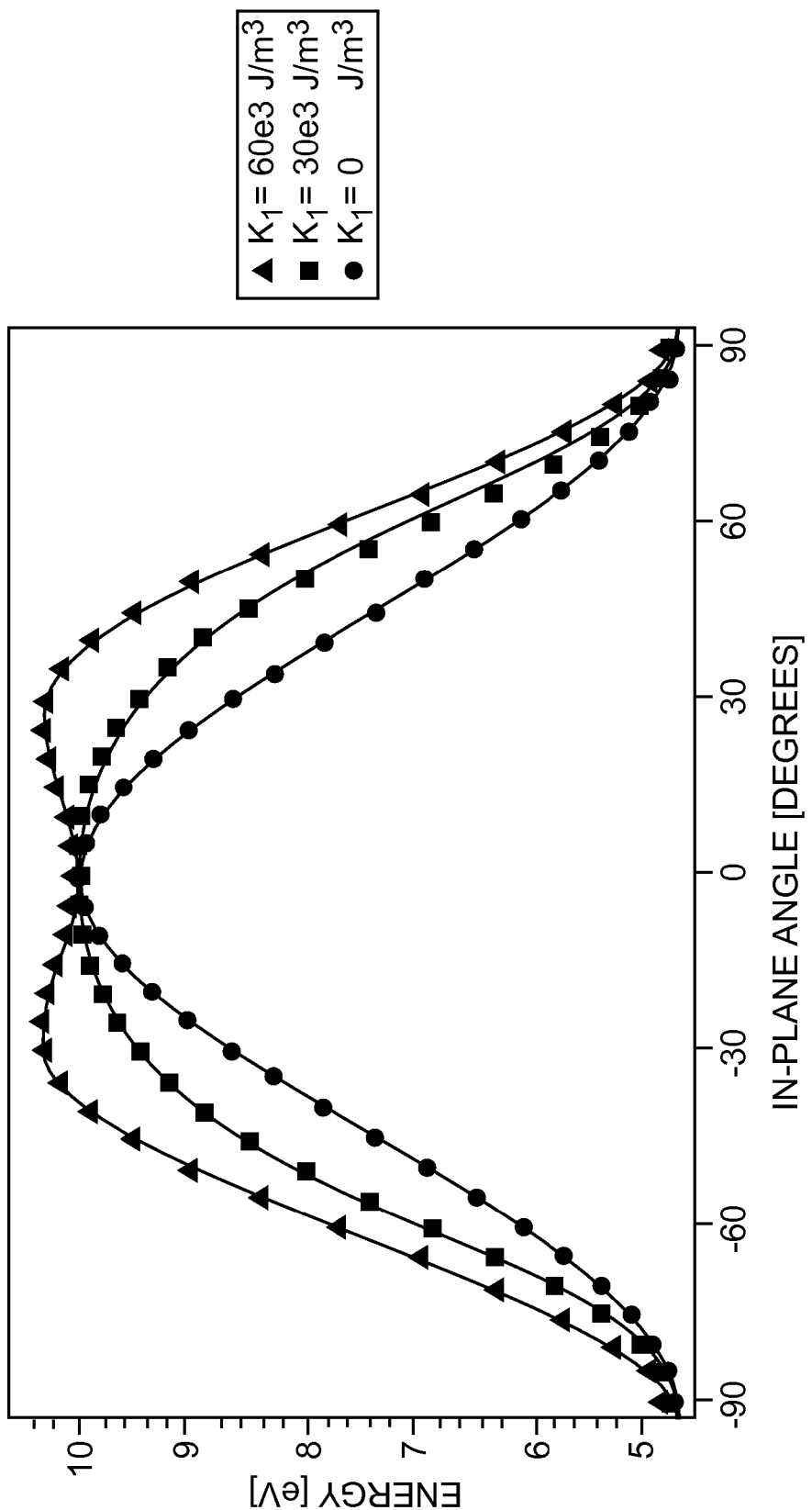
FIG. 5 is a graph illustrating metastability along a hard axis as a function of a biaxial anisotropy characteristic.

FIG. 5 is a graph showing magnetization energy levels associated with magnetization direction along the hard axis corresponding to nanomagnets having biaxial anisotropy constants of $30 kJ/m^3$ and $60 kJ/m^3$, respectively, compared to the energy level of nanomagnets having no biaxial anisotropy term (reflected by the line associated with a biaxial anisotropy constant of 0 $kJ/m^3$), and thus whose hard axis is not metastable. The graph illustrates that the increase in the biaxial anisotropy constant $K_1$ increases the stability of magnetization direction along the hard axis. According to one embodiment of the present invention, nanomagnets 10 have a biaxial anisotropy constant in a range from about 1 $kJ/m^3$ to about 60 $kJ/m^3$.

Figure 6:
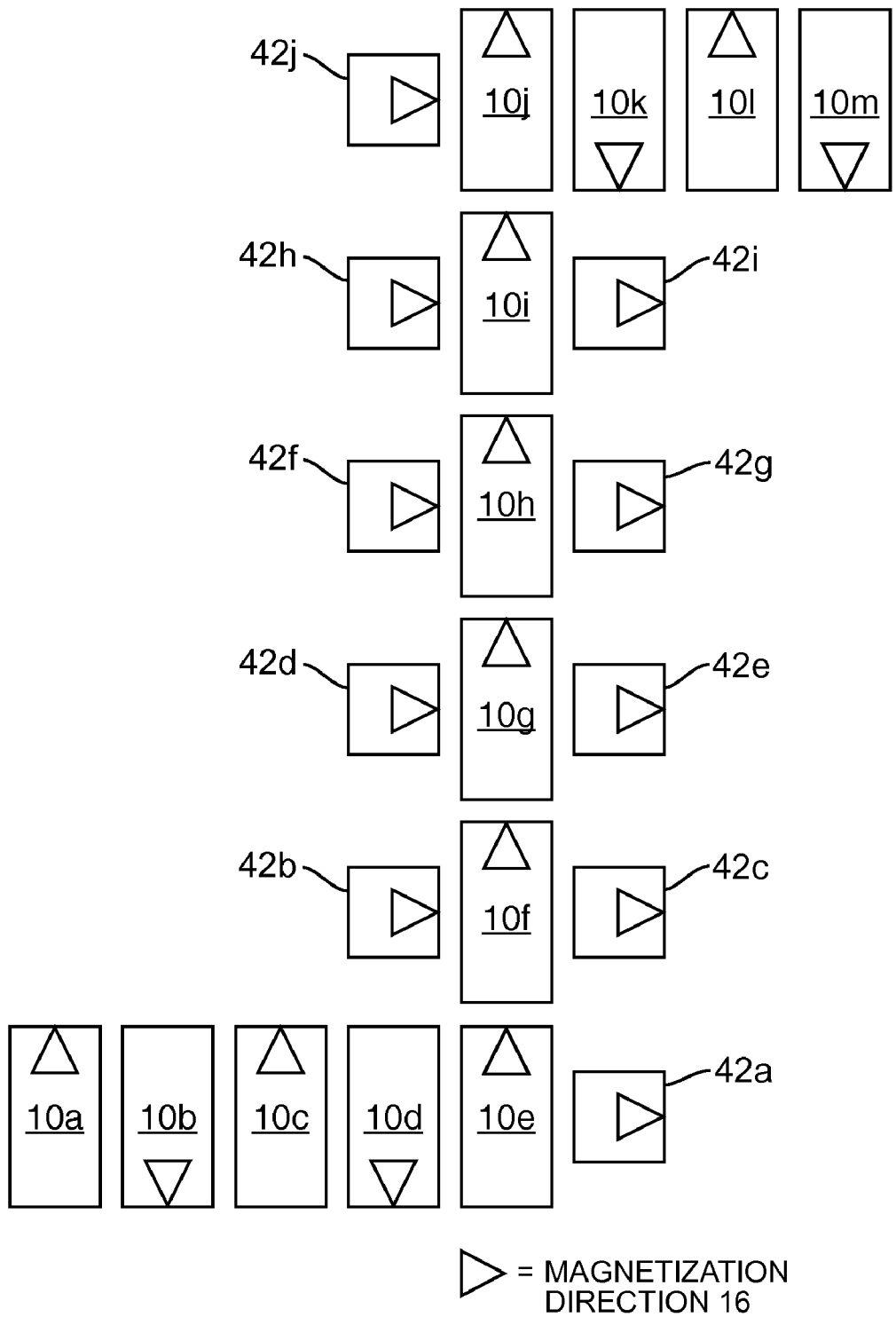
FIG. 6 is an illustration of a column of nanomagnets with their magnetization directions aligned along their respective easy axes, and stabilizer nanomagnets positioned adjacent to the column of nanomagnets to increase stability.

FIG. 6 is an illustration showing signal propagation along rows of nanomagnets interconnected by a column of nanomagnets. As used herein, the term 'column' will refer to an arrangement of nanomagnets arranged in a line extending through their easy axes, as shown in FIG. 6 with respect to nanomagnets 10e through 10j. In contrast to nanomagnets arranged in rows, dipole fields from adjacent nanomagnets arranged in a column oppose parallel magnetization direction along the hard axis, and consequently hinder mutually parallel hard-axis stability. In certain situations, stability may need to be further enhanced to establish sufficient stability of alignment along the hard axis to reliably propagate signals along a column of nanomagnets. According to one embodiment of the present invention, stabilizer nanomagnets 42b and 42c can be positioned adjacent to nanomagnet 10f to increase stability of hard-axis magnetization alignment, thereby preventing premature alignment along the easy axis. The stabilizer nanomagnets 42a through 42j can be formed in relatively square shapes to minimize shape-induced anisotropy. The biaxial anisotropy characteristic and the relatively large magnetic dipole moment render the stabilizer nanomagnets 42a through 42j relatively impervious to stray dipole fields from surrounding nanomagnets.

Once their magnetization directions 16 are forced to align along the hard axis, the magnetization directions 16 of the stabilizer nanomagnets 42a through 42j remain pointing in the desired direction, increasing stability of the adjacent signal-propagating nanomagnets 10e through 10j. In FIG. 6, signal propagation is shown beginning with nanomagnet 10a, continuing along the row of nanomagnets 10a through 10e, moving up the vertical column of nanomagnets formed by the nanomagnets 10e through 10j, and continuing along the row of nanomagnets 10j through 10m. Due to the combination of the metastability and the use of stabilizer nanomagnets 42b through 42j adjacent to the nanomagnets 10e through 10j arranged in a column, reliability of signal propagation is enhanced. It should be noted that, in contrast to signal propagation in a row of nanomagnets, signal propagation in a column of nanomagnets typically occurs through parallel alignment of magnetization direction 16, rather than anti-parallel alignment.

Figure 7:
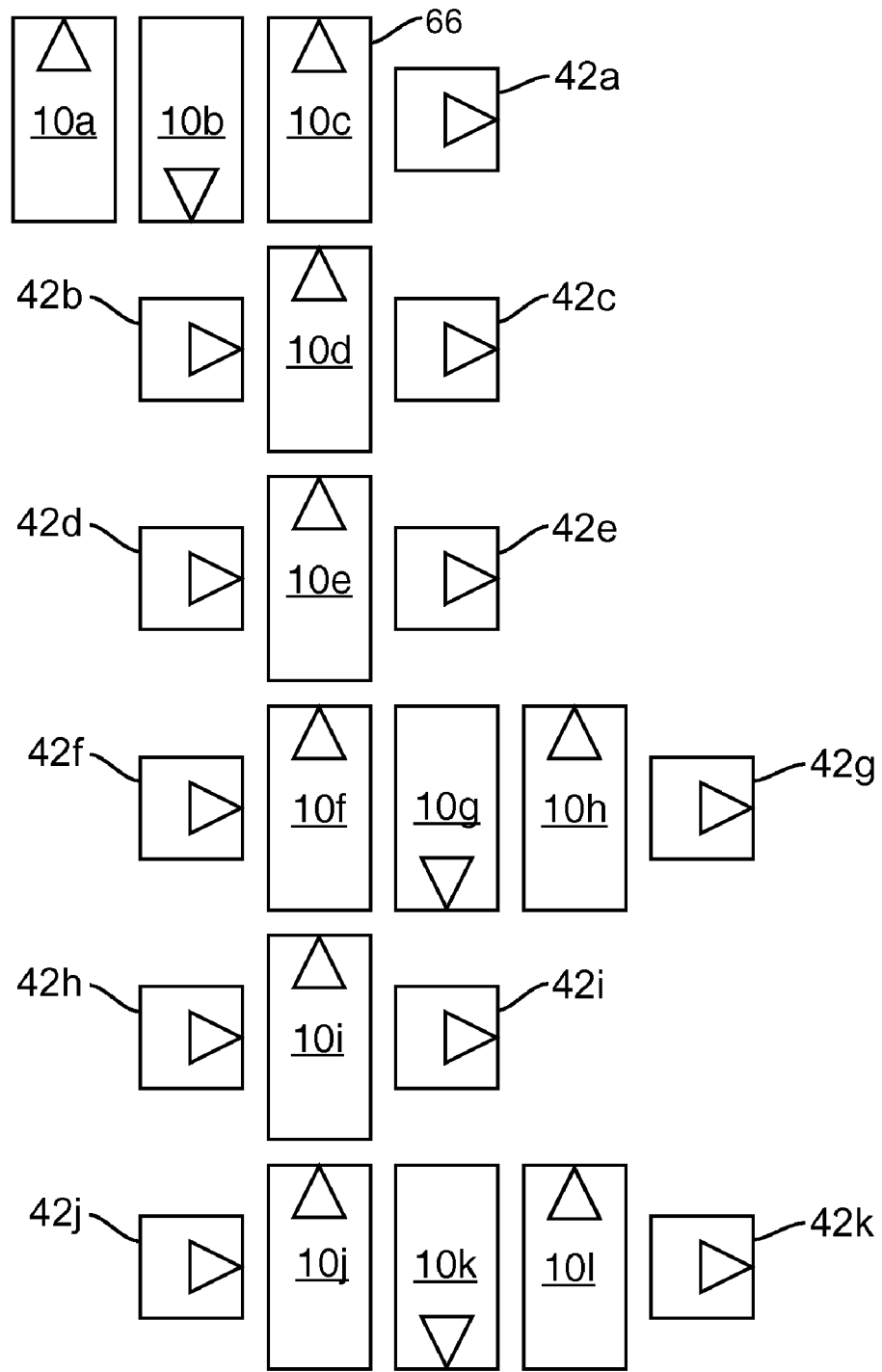
FIG. 7 is an illustration showing fanout of a signal propagated through nanomagnets.

FIG. 7 is an illustration showing fanout of a signal along an arrangement of nanomagnets 10a through 10l according to one embodiment of the present invention. Signal propagation begins by perturbing the nanomagnet 10a such that its magnetization direction 16 points upward. The signal propagates to nanomagnet 10c, which is arranged at the top of a column of nanomagnets and continues down the column of nanomagnets and then along two rows of nanomagnets terminated by nanomagnet 10h and nanomagnet 10l, respectively. Thus, the signal has been propagated into two paths ending with the nanomagnets 10h and 10l. Stabilizer nanomagnets 42a through 42k increase hard-axis stability of the nanomagnets 10c through 10l arranged in a column.

Figure 8A:
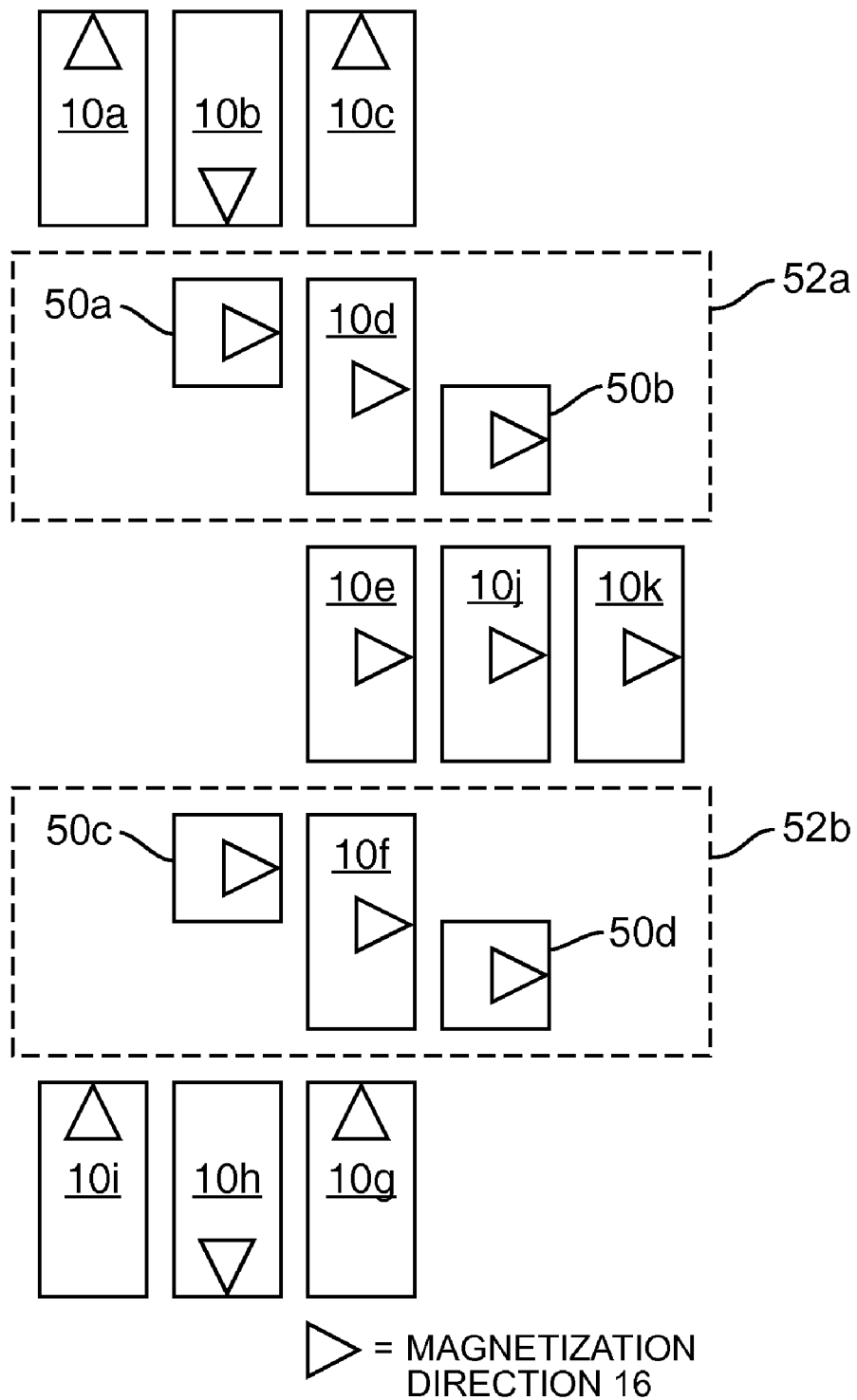
FIGS. 8A through 8D illustrate signal propagation through a nanomagnetic logic gate.

According to one embodiment of the present invention, nanomagnets can be arranged to form nanomagnetic logic gates. FIGS. 8A through 8D illustrate an AND logic gate comprising nanomagnets 10a through 10g, according to one embodiment of the present invention. Referring to FIG. 8A, the inputs to the AND logic gate are nanomagnets 10a and 10i. As used herein, magnetization direction pointing upward will be referred to as a binary one, magnetization direction pointing downward will be referred to as a binary zero, and magnetization direction along the hard axis will be defined as no output. Nanomagnet 10d, along with destabilizer nanomagnets 50a and 50b, form a unidirectional nanomagnet, whose magnetization direction 16 cannot point upward. However, the magnetization direction 16 of the nanomagnet 10d can be perturbed to point downward if the magnetization direction 16 of a neighboring nanomagnet, such as nanomagnet 10c or nanomagnet 10e, points downward. Thus, the nanomagnet 10d forms, in conjunction with the destabilizer nanomagnets 50a and 50b, a magnetic diode 52a that passes a signal only if the signal has the correct polarity. Nanomagnet 10f and destabilizer nanomagnets 50c and 50d also form a magnetic diode 52b. The destabilizer nanomagnets 50a through 50d preferably maintain a magnetization direction 16 pointing to the right due to the biaxial anisotropy characteristic and, if appropriate, can be shaped into a rectangular shape with their long axes being parallel to the short axis of the nanomagnets 10a through 10g, such that shape anisotropy reinforces stability of the magnetization direction 16 to the right.

Figure 8B:
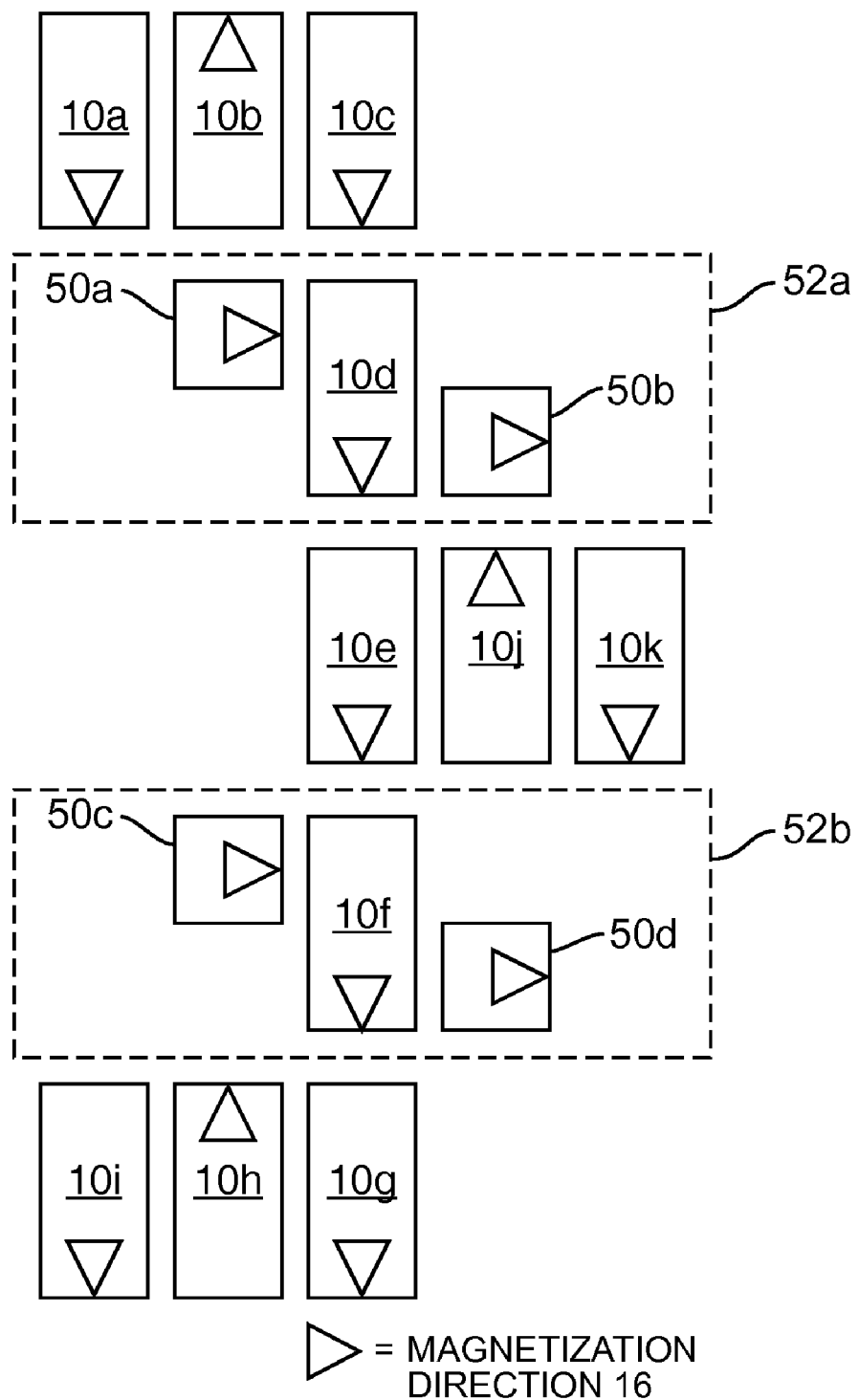
Figure 8C:
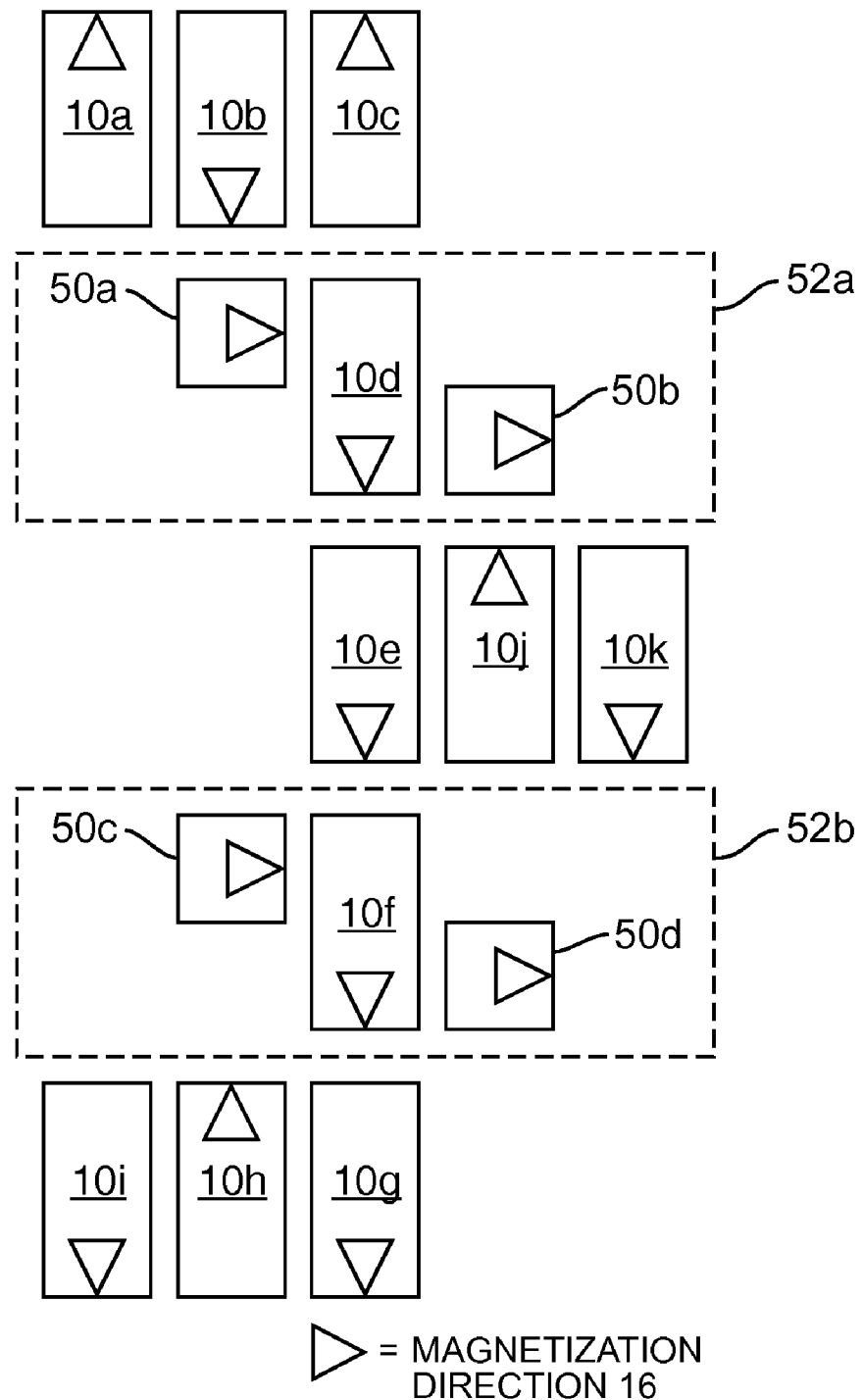
Figure 8D:
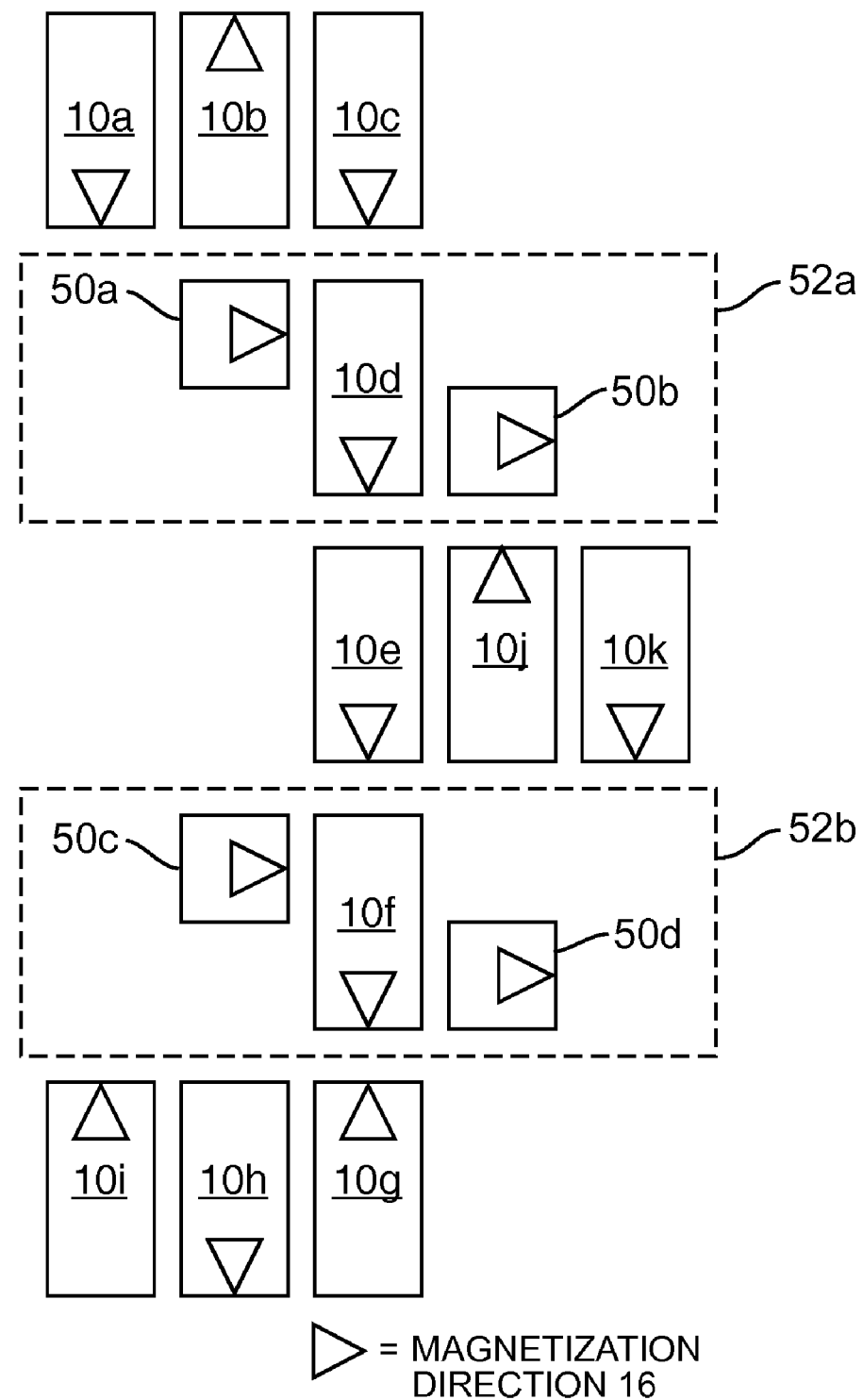

In practice, if a digital one is presented at the inputs of the AND logic gate, as reflected by the upward magnetization direction 16 of the nanomagnets 10a and 10i, signal propagation along the vertical column of nanomagnets formed by the nanomagnets 10c through 10g will be inhibited by the magnetic diodes 52a and 52b such that output of the AND logic gate at nanomagnet 10k will be no output. However, if a zero is presented at the input of either signal path, as shown in FIGS. 8B through 8D, signal propagation will continue through the magnetic diodes 52a and 52b, respectively, such that the signal output at the nanomagnet 10k is a zero. The particular arrangement of the nanomagnets 10a through 10g and the destabilizer nanomagnets 50a through 50d shown in FIGS. 8A through 8D is referred to as a lazy AND gate, wherein inputs of 01, 10, or 00 result in a zero output and an input of 11 results in a no output condition. For the sake of illustration, stabilizer nanomagnets are not shown in FIGS. 8A through 8D; however, it should be appreciated that such stabilizer nanomagnets may be utilized where appropriate to increase hard-axis stability of any particular nanomagnet 10a through 10g.

FIGS. 9(a) and 9(b) illustrate a problem that can arise when performing Boolean operations in a nanomagnetic logic gate, referred to commonly as a 'race condition.' A race condition is a condition where an output of a nanomagnetic logic gate differs depending on the timing of the input signals to the nanomagnetic logic gate. In most situations, a race condition is non-preferred. For example, with reference to FIG. 9(a), inputs to the nanomagnetic logic gate are nanomagnets 10a, 10b, and 10c. The output from the nanomagnetic logic gate is nanomagnet 10e. The signal, a binary one, from the nanomagnet 10b has arrived at nanomagnet 10d prior to inputs arriving from the nanomagnets 10a and 10c. If the dipole field coupling between the nanomagnet 10b and the nanomagnet 10d is sufficiently strong such that magnetization direction 16 of the nanomagnet 10b can move the magnetization direction 16 of the nanomagnet 10d off its respective hard axis, then the signal from the nanomagnet 10b causes the magnetization direction 16 of the nanomagnet 10d to swing downward along its easy axis, resulting in the output nanomagnet 10e having a magnetization direction 16 pointing upward along its easy axis, irrespective of what signals may later arrive from the input nanomagnets 10a and 10c. For example, if binary zeros later appear at nanomagnets 10a and 10c, then the output at nanomagnet 10e is erroneous. One way to prevent this behavior is to prevent the signal from the nanomagnet 10b, by itself, to be sufficient to cause signal propagation to the nanomagnet 10d. FIG. 9(b) is an illustration showing signals arriving at input nanomagnets 10a and 10c prior to the signal arriving from nanomagnet 10b. Signals arriving at the nanomagnets 10a and 10c essentially cancel one another because their magnetization directions 16 are pointing in opposite directions (binary one and binary zero, respectively). Unlike the instance shown in FIG. 9(a), in this example it would be desirable for the dipole field coupling between nanomagnet 10b and nanomagnet 10d to be sufficiently strong such that the magnetization direction 16 of the nanomagnet 10b can move the magnetization direction 16 of the nanomagnet 10d off its respective hard axis. If the signal from the nanomagnet 10b is not sufficient by itself to propagate a signal to the nanomagnet 10d, the nanomagnetic logic gate will not work. The inconsistency between the example shown in FIG. 9(a) and the example shown in FIG. 9(b) regarding whether or not it is desirable for nanomagnet 10b to propagate a signal by itself illustrates the problems associated with race conditions.

FIGS. 10A and 10B are illustrations of a logic gate according to one embodiment of the present invention which reduces or eliminates race conditions. Referring to FIG. 10A, input signals arrive at nanomagnets 10a and 10j, respectively, and the output of the logic gate is reflected at nanomagnet 10s. Nanomagnet 10r can be influenced by the magnetization directions 16 of nanomagnets 10q, 10t, and 10u, respectively. According to one embodiment of the present invention, the nanomagnets 10t and 10u are both sized and positioned with respect to the nanomagnet 10r such that the magnetic field of either nanomagnet 10t or 10u by itself cannot perturb the magnetization direction 16 of the nanomagnet 10r to an extent necessary to cause the magnetization direction 16 of the nanomagnet 10r to align along its easy axis, but the combination of the magnetic fields of the nanomagnets 10t and 10u together is sufficiently strong to cause the magnetization direction 16 of the nanomagnet 10r to align along its easy axis. The nanomagnet 10q, on the other hand, is sized and/or positioned such that the magnetic field of the nanomagnet 10q is strong enough by itself to cause the magnetization direction 16 of the nanomagnet 10r to align along its easy axis.

The nanomagnets illustrated in FIGS. 10A and 10B are arranged to form an AND gate; however, it will be apparent to those skilled in the art that a nanomagnet can either be added or subtracted from any input or output to create a NOR, AND, NAND, or OR gate. An example of signal propagation through the AND gate shown in FIG. 10A will now be provided. Initially, two binary ones are presented at the input nanomagnets 10a and 10j, respectively. Magnetic diodes 52a and 52b inhibit signal propagation along the column of nanomagnets formed by nanomagnets 10c, 10g, 10h, 10i, and 10l and result in the nanomagnet 10q having no output. The nanomagnets 10t and 10u, however, each have a magnetization direction 16 pointing downward and, in combination, force the magnetization direction 16 of the nanomagnet 10r to point downward, causing the magnetization direction 16 of the nanomagnet 10s to point upward. Because closely coupled nanomagnet 10q had no output, it did not impact the final output at nanomagnet 10s.

Referring to FIG. 10B, a binary zero is presented at input nanomagnet 10a and a binary one is presented at input nanomagnet 10j. Signal propagation of the binary zero is successful through a magnetic diode 52a, causing closely coupled nanomagnet 10q to have a magnetization direction 16 pointing downward, which immediately influences nanomagnet 10r to point upward, resulting in the magnetization direction 16 of output nanomagnet 10s to point downward. Loosely coupled nanomagnets 10t and 10u have their magnetization directions 16 pointing in opposite directions, thus cancelling out any effect on the nanomagnet 10r. Consequently, in situations where the inputs to the input nanomagnets 10a and 10j are either 01, 10, or 00, the nanomagnet 10q will dictate the output of the nanomagnetic logic gate, and the loosely coupled nanomagnets 10t and 10u will either cancel each other or will be in agreement with the closely coupled nanomagnet 10q, so timing of signal propagation with respect to such nanomagnets is not critical. Where the input signals to the input nanomagnets 10a and 10j are 11, as shown with respect to FIG. 10A, the closely coupled nanomagnet 10q will have no output, and the output of output nanomagnet 10s will be influenced by the loosely coupled nanomagnets 10t and 10u, so again the timing of signal propagation with respect to such nanomagnets is not critical. Thus, FIGS. 10A and 10B illustrate how sizing and positioning certain nanomagnets in a nanomagnetic logic gate can eliminate race conditions.

Those skilled in the art will recognize improvements and modifications to the preferred embodiments of the present invention. All such improvements and modifications are considered within the scope of the concepts disclosed herein and the claims that follow.

What is claimed is:

1. A structure, comprising: a substrate; and a plurality of nanomagnets on the substrate, each nanomagnet of the plurality of nanomagnets comprising a first axis that is bistable and a second axis that is metastable, and being at a local energy minimum when a magnetization direction of the each nanomagnet is aligned with the second axis, the plurality of nanomagnets being aligned with one another along one of the first axis and the second axis and sufficiently proximate to one another such that the magnetization direction of adjacent ones of the plurality of nanomagnets affect one another wherein a change in the magnetization direction of a first of the plurality of nanomagnets is propagated along remaining ones of the plurality of nanomagnets.

2. The structure of claim 1, wherein each of the plurality of nanomagnets have a long dimension and a short dimension, and wherein the first axis is parallel to the long dimension and the second axis is parallel to the short dimension, and wherein the first axis is a magnetically easy axis and the second axis is a magnetically hard axis.

3. The structure of claim 2, wherein each of the plurality of nanomagnets further comprises a primary anisotropy characteristic and a secondary anisotropy characteristic, and wherein a hard axis associated with the primary anisotropy characteristic aligns with an easy axis associated with the secondary anisotropy characteristic to form the second axis.

4. The structure of claim 3, wherein the primary anisotropy characteristic is a uniaxial anisotropy characteristic and the second anisotropy characteristic is a biaxial anisotropy characteristic.

5. The structure of claim 4, wherein a magnetization energy associated with the magnetization direction of at least one of the plurality of nanomagnets can be quantified in accordance with an approximation of the equation:

$$U(\theta)=K_u \cos^2(\theta)+\tfrac{1}{4}K_1 \sin^2(2\theta),$$

wherein U is an energy level, $K_u$ is a uniaxial anisotropy constant associated with the uniaxial anisotropy characteristic, $\theta$ is an in-plane angle of the magnetization direction relative to the second axis, and $K_1$ is a biaxial anisotropy constant associated with the biaxial anisotropy characteristic.

6. The structure of claim 5, wherein $K_1$ is from 1 kJ/m$^3$ to 60 kJ/m$^3$.

7. The structure of claim 2, wherein the plurality of nanomagnets are aligned with one another along the second axis.

8. The structure of claim 7, wherein the magnetization direction is propagated along the remaining ones of the plurality of nanomagnets anti-parallel with respect to the magnetization direction of the adjacent ones of the plurality of nanomagnets.

9. The structure of claim 2, wherein the plurality of nanomagnets are aligned with one another along the first axis.

10. The structure of claim 9, wherein the magnetization direction is propagated along the remaining ones of the plurality of nanomagnets in a parallel direction with respect to the magnetization directions of the adjacent ones of the plurality of nanomagnets.

11. The structure of claim 9, further comprising a second plurality of nanomagnets on the substrate, each of the second plurality of nanomagnets comprising a first axis that is bistable and a second axis that is metastable, the second plurality of nanomagnets being aligned with one another along the second axis and sufficiently proximate to one another such that the magnetization direction of adjacent ones of the second plurality of nanomagnets affect one another wherein a change in the magnetization direction of a first of the second plurality of nanomagnets is propagated along remaining ones of the second plurality of nanomagnets, and wherein one of the plurality of nanomagnets is one of the second plurality of nanomagnets.

12. The structure of claim 1, wherein each of the plurality of nanomagnets is anisotropic.

13. An apparatus for propagating a signal, comprising:
a substrate;
a plurality of nanomagnets on the substrate, each of the plurality of nanomagnets comprising a first axis that is bistable and a second axis that is metastable, the plurality of nanomagnets being aligned with one another along one of the first axis and the second axis and sufficiently proximate to one another such that a magnetization direction of one of the plurality of nanomagnets can affect the magnetization direction of an adjacent one of the plurality of nanomagnets;
an alignment apparatus operative to force the magnetization direction of the plurality of nanomagnets into alignment along one of the first axis and the second axis of each of the plurality of nanomagnets; and
a perturbation apparatus operative to change the magnetization direction of one of the plurality of nanomagnets such that a change in the magnetization direction is propagated along remaining ones of the plurality of nanomagnets.

14. The apparatus of claim 13, wherein each of the plurality of nanomagnets further comprises a primary anisotropy characteristic and a secondary anisotropy characteristic, and wherein a hard axis associated with the primary anisotropy characteristic aligns with an easy axis associated with the secondary anisotropy characteristic to form the second axis.

15. The apparatus of claim 14, wherein the primary anisotropy characteristic is a uniaxial anisotropy characteristic and the secondary anisotropy characteristic is a biaxial anisotropy characteristic.

16. The apparatus of claim 15, wherein a magnetization energy associated with the magnetization direction of at least one of the plurality of nanomagnets can be quantified in accordance with an approximation of the equation:

$$U(\theta) = K_u \cos^2(\theta) + \tfrac{1}{4} K_1 \sin^2(2\theta),$$

wherein U is an energy level, $K_u$ is a uniaxial anisotropy constant associated with the uniaxial anisotropy characteristic, $\theta$ is an in-plane angle of the magnetization direction relative to the second axis, and $K_1$ is a biaxial anisotropy constant associated with the biaxial anisotropy characteristic.

17. The apparatus of claim 16, wherein $K_1$ is from 1 kJ/m$^3$ to 60 kJ/m$^3$.

18. The apparatus of claim 13, wherein each of the plurality of nanomagnets have a long dimension and a short dimension, and wherein the first axis is parallel to the long dimension and the second axis is parallel to the short dimension.

19. The apparatus of claim 18, wherein the plurality of nanomagnets are aligned with one another along the second axis.

20. The apparatus of claim 18, wherein the plurality of nanomagnets are aligned with one another along the first axis.

21. A method of propagating a signal on a substrate comprising a plurality of nanomagnets, each of the plurality of nanomagnets comprising a first axis that is bistable and a second axis that is metastable, the plurality of nanomagnets being aligned with one another along one of the first axis and the second axis and sufficiently proximate to one another such that a magnetization direction of adjacent ones of the plurality of nanomagnets affect one another wherein a change in the magnetization direction of a first of the plurality of nanomagnets is propagated along remaining ones of the plurality of nanomagnets, the method comprising:
forcing the magnetization direction of each of the plurality of nanomagnets to align with one of the first axis and the second axis; and
perturbing the magnetization direction of one of the plurality of nanomagnets sufficient to change the magnetization direction such that the change in the magnetization direction is propagated along the remaining ones of the plurality of nanomagnets.

22. The method of claim 21, wherein each of the plurality of nanomagnets further comprises a primary anisotropy characteristic and a secondary anisotropy characteristic, and wherein a hard axis associated with the primary anisotropy characteristic aligns with an easy axis associated with the secondary anisotropy characteristic to form the second axis.

23. The method of claim 22, wherein the primary anisotropy characteristic is a uniaxial anisotropy characteristic and the secondary anisotropy characteristic is a biaxial anisotropy characteristic.

24. A structure, comprising: a substrate; and a plurality of nanomagnets on the substrate, each of the plurality of nanomagnets having a long dimension and a short dimension and comprising a first axis that is bistable and parallel to the long dimension, and a second axis that is metastable and parallel to the short dimension, wherein the first axis is a magnetically easy axis and the second axis is a magnetically hard axis, the plurality of nanomagnets being aligned with one another along one of the first axis and the second axis and sufficiently proximate to one another such that a magnetization direction of adjacent ones of the plurality of nanomagnets affect one another wherein a change in the magnetization direction of a first of the plurality of nanomagnets is propagated along remaining ones of the plurality of nanomagnets.

* * * * *